United States Patent [19]

Hosaka et al.

[11] 4,404,259
[45] Sep. 13, 1983

[54] MAGNETIC RECORDING MEDIUM

[75] Inventors: Akihiko Hosaka; Yukihiro Isobe; Kiyotaka Okuyama, all of Tokyo, Japan

[73] Assignee: TDK Electronics Co., Ltd., Tokyo, Japan

[21] Appl. No.: 313,611

[22] Filed: Oct. 21, 1981

[30] Foreign Application Priority Data

Oct. 21, 1980 [JP] Japan .................................. 55-146341

[51] Int. Cl.$^3$ .............................................. G11B 5/70
[52] U.S. Cl. ............................ 428/425.9; 252/62.54; 360/134; 360/135; 360/136; 427/128; 428/423.7; 428/480; 428/481; 428/482; 428/483; 428/694; 428/900; 428/695
[58] Field of Search ............... 428/900, 694, 695, 480, 428/481, 425.9, 423.7, 482, 483; 427/128; 252/62.54; 360/134, 135, 136

[56] References Cited

U.S. PATENT DOCUMENTS

| 4,115,290 | 9/1978 | Kubota et al. | 252/62.54 |
| 4,238,548 | 12/1980 | Okuyama et al. | 428/480 |
| 4,357,391 | 11/1982 | Hosaka | 428/413 |

FOREIGN PATENT DOCUMENTS 55-70936  5/1980  Japan ................................... 427/128

Primary Examiner—Ellis P. Robinson
Attorney, Agent, or Firm—Oblon, Fisher, Spivak, McClelland & Maier

[57] ABSTRACT

A magnetic recording medium having a substrate coated with a magnetic layer comprises a magnetic powder and a binder, essentially consisting of 40 to 80 wt. % of a polyester resin, 60 to 20 wt. % of a nitrocellulose impregnated with vinyl chloride-vinyl acetate copolymer as a protective component and a polyisocyanate.

10 Claims, 2 Drawing Figures

MAGNETIC RECORDING MEDIUM

BACKGROUND OF THE INVENTION

1. Field of the Invention

The present invention relates to a magnetic recording medium. More particularly, it relates to a magnetic recording medium which imparts satisfactory repeat running durability and mechanical strength as adhesive strength. The present invention also relates to a composition of binders for a magnetic recording medium which imparts excellent repeat running durability without losing the adhesive strength in the preparation of a magnetic recording medium having a thin thickness as a cassette magnetic recording medium.

2. Description of the Prior Art

The magnetic recording medium usually prepared by coating a magnetic powder composition comprising a magnetic powder and a binder on a substrate such as film made of polyacetate, polyvinyl chloride or polyester to form a magnetic layer on the substrate.

Recently, the usages of the magnetic recording medium has been expanded and higher characteristics have been further required. For example, the recording time could be prolonged by using a magnetic recording tape having longer length and thinner thickness. Recently, it has been succeeded to prepare a magnetic recording medium having a polyester base film having a thickness of 5 to 6μ and a magnetic layer having a thickness of 3 to 4μ as a thinner tape. In the magnetic recording tape, the film base as the substrate is thin whereby the mechanical strength is inferior and one side elongation or certain bending is easily caused by repeat running of the magnetic recording tape and certain abnormal running is caused to prevent normal recording and reproduction which are important and indispensable for the magnetic recording medium. Consequently, it is sometimes difficult to use such films.

On the other hand, in order to prevent such disadvantages, it has been studied to improve both the base film and the coated magnetic layer. Various improvements of strength of the base film have been studied. However, a satisfactory result has not been attained from the viewpoint.

In view of the problems of the conventional technology, it has been studied to improve the magnetic layer of the magnetic recording medium and to increase the mechanical strength and to impart excellent stable function for recording and reproduction by improving the binder incorporated in the magnetic layer.

Various studies have been made to overcome the disadvantages depending upon the magnetic layer of the conventional magnetic recording medium.

SUMMARY OF THE INVENTION

It is an object of the present invention to improve the mechanical strength of a magnetic recording medium and to attain excellent stable recording and reproducing function by improving a binder of a magnetic layer of the magnetic recording medium.

The foregoing and other objects of the present invention have been attained by using three components of a polyester, a nitrocellulose impregnated with vinyl chloride-vinyl acetate copolymer and a polyisocyanate to improve the repeat running durability without a deterioration of the adhesive strength.

The present invention is to provide a magnetic recording medium having a substrate coated with a magnetic layer which comprises a binder having the formulation of 40 to 80 wt.% of a polyester, 60 to 20 wt.% of nitrocellulose impregnated with a vinyl chloride-vinyl acetate copolymer as a protective component and a polyisocyanate.

DETAILED DESCRIPTION OF THE PREFERRED EMBODIMENTS

Figure 1:
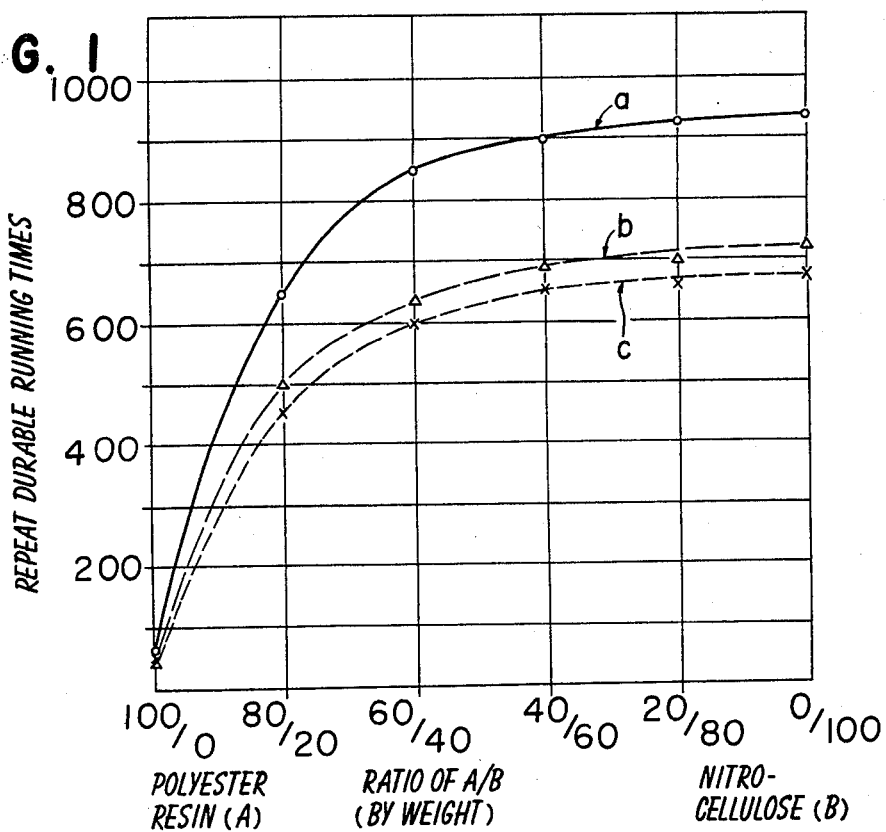
FIG. 1 is a graph for comparing repeat durable running times of samples of Examples and References.

In the present invention, it is important to use nitrocellulose impregnated with a vinyl chloride-vinyl acetate copolymer as a protective component which is replaced from isopropyl alcohol or dibutyl phthalate. Nitrocellulose has been used as a binder in view of high affinity to the magnetic powder and high leveling of the magnetic powder composition. Nitrocellulose is easily fired. It is necessary to consider the prevention of firing and explosion. In order to maintain safety in the storage and handling of nitrocellulose, it is necessary to prevent dusting and explosion pursuant to the regulation. Nitrocellulose impregnated with isopropyl alcohol or dibutyl phthalate as a protective component has been used. When isopropyl alcohol is incorporated, hydroxyl group of the alcohol reacts with isocyanate group of the polyisocyanate whereby the crosslinkage of the binder is reduced. When dibutyl phthalate is incorporated, the magnetic layer is weaken since the binder is plasticized. The effect for reinforcing the mechanical strength of the magnetic layer is disadvantageously deteriorated by isopropyl alcohol or dibutyl phthalate.

In the present invention, nitrocellulose impregnated with the vinyl chloride-vinyl acetate copolymer is used instead of the nitrocellulose impregnated with isopropyl alcohol or dibutyl phthalate and is combined with the polyester at a desired ratio and they are crosslinked with the polyisocyanate to improve the mechanical strength.

The polyester resin can be commercially available polyester resins as a binder such as Nippolan 1004, 2006 and 4032 (Nippon Polyurethane Co.); Desmophene 650, 800, 1100 and 1700 (Bayer AG); Bairon 200, 300, 500 and 53S (Toyo Boseki Co.). Saturated or unsaturated linear polyesters for a binder a preferably used and are described in Encyclopedia of Polymer Science and Technology. The properties of the typical polyester resins are shown in Table.

TABLE

| Polyester | OH value | Acid value | Solid (%) | Viscosity (cps/75° C.) |
|---|---|---|---|---|
| Desmophen 800 | 280–300 | <4 | 100 | 2200–3800 |
| Desmophen 800-75E | 207–228 | <3 | 74–76 | H ~ P (Gardner) |
| Desmophen 1100 | 205–221 | <4 | 100 | 550–750 |
| Desmophen 1100-75E | 150–170 | <3 | 74–76 | D ~ H (Gardner) |
| Desmophen 2200 | 57–64 | <2 | 100 | 925–1074 |
| Nippolan 1004 | 37–45 | <2 | 100 | 600–900 |
| Nippolan 2006 | 375–425 | <10 | 100 | 7000–17000 |
| Nippolan | 158–176 | <4 | 100 | 350–550 |

TABLE-continued

3023

| Polyester resin | Intrinsic viscosity | Molecular weight | Melting point (°C.) |
|---|---|---|---|
| Bairon 200 | 0.53 | 15000–20000 | 180–200 |
| Bairon 300 (Interplasticized) | 0.68 | 15000–20000 | 140–160 |

The nitrocellulose used in the present invention can be nitrocellulose impregnated with a vinyl chloride-vinyl acetate copolymer such as VAGH (manufactured by UCC). The content of the vinyl chloride-vinyl acetate copolymer is usually in a range of 5 to 30 wt.% usually about 15 wt.%. The nitrocellulose can be H-$\frac{1}{2}$ and RS-20 (manufactured by Asahi Kasei) and H-$\frac{1}{2}$, RS-20 (manufactured by Daicel). The isopropyl alcohol component or dibutyl phthalate component in the nitrocellulose is substituted with the vinyl chloride-vinyl acetate copolymer by mixing them and separating the isopropyl alcohol or dibutyl phthalate. The vinyl chloride-vinyl acetate copolymer can be the conventional copolymers used for the magnetic layer.

The typical polyurethane prepolymers are reaction products of a diisocyanate and a polyester or a polyether. The typical diisocyanates can be MDI (diphenylmethane diisocyanate); DMDI (dimethyl diphenylmethane diisocyanate); HMDI (hexamethylene diisocyanate); and TDI (tolylene diisocyanate). The typical polyesters can be reaction products of an aliphatic dicarboxylic acid and a polyhydric alcohol and the aliphatic dicarboxylic acid can be adipic acid and suberic acid and the polyhydric alcohol can be ethyleneglycol, propyleneglycol, 1,3-propanediol, 1,4-butanediol, 1,5-pentanediol, 1,6-hexanediol, neopentylglycol, diethyleneglycol, dipropyleneglycol, ethyleneoxide adducts or propyleneoxide adducts. The molecular weight of the prepolymer is usually in a range of $1 \times 10^3$ to $1 \times 10^5$ preferably $1 \times 10^4$ to $1 \times 10^5$.

The polyisocyanate added for the purpose can be commercially available polyisocyanates such as "Colonate L", "Colonate HL", "Colonate 2036" manufactured by Nippon Polyurethane Co. and "Desmodule L" manufactured by Bayer A. G.

In the three component binder, a ratio of the polyester to the nitrocellulose is usually in a range of 80:20 to 40:60 wt.%. When the ratio of the polyester is more than 80 wt.% the adhesive strength is improved, but a soft magnetic layer is formed to increase friction whereby the repeat running durability is remarkably inferior. On the other hand, when a ratio of the nitrocellulose is more than 60 wt.%, a hard magnetic layer is formed, but the adhesive strength is inferior whereby the magnetic layer is peeled off or the smooth contact of a magnetic head with the magnetic recording medium is not attained in the repeated running and the practical trouble is caused.

The polyisocyanate as a crosslinking agent is preferably incorporated at a ratio of 5 to 20 wt.% based on the total binder. When it is less than 5 wt.%, the satisfactory crosslinking and hardening is not attained, whereas when it is more than 20 wt.%, the adhesive strength to the base film is inferior or the curling phenomenon is caused.

The resulting magnetic recording medium has excellent electromagnetic transfer characteristic and excellent physical characteristics such as repeat running durability and adhesive strength.

The kinds of the magnetic powder, the solvent and the additives and the preparation of the magnetic layers and the conditions are well-known in this field and accordingly, they are not repeated in this specification.

The present invention will be illustrated by certain examples and references which are provided for purposes of illustration only and are not intended to be limiting the invention.

| | |
|---|---|
| $\gamma$-Fe$_2$O$_3$ magnetic powder | 400 wt. parts |
| Dispersing agent (Lecithin): | 8 wt. parts |
| Polyester resin (Nippolan 1004 manufactured by Nippon Polyurethan Co.): | A wt. parts |
| Nitrocellulose substituted with vinyl chloride-vinyl acetate copolymer: | B wt. parts |
| Lubricant: { Myristic acid 3 wt. parts  Butyl myristate 2 wt. parts } | 5 wt. parts |
| Methyl ethyl ketone: | 400 wt. parts |
| Methyl isobutyl ketone: | 200 wt. parts |
| Cyclohexanone: | 100 wt. parts |

The components were thoroughly mixed by a disperser for paint, and polyisocyanate (Colonate L manufactured by Nippon Polyurethane Co.) was incorporated at a ratio of 12 wt.% based on the total amounts of the resins and the mixture was stirred to be uniform to prepare a magnetic powder composition. The composition was coated in a thickness of 3$\mu$ on a polyethyleneterephthalate film having a thickness of 6$\mu$. The surface of the coated layer was processed by a super calender treatment and cured by heating it at about 60° C. for 40 hours. The product was cut in a width of $\frac{1}{8}$ inch to prepare each magnetic recording tape.

Magnetic recording tapes were prepared by using the polyester resin and the nitrocellulose impregnated with vinyl chloride-vinyl acetate copolymer at various ratios.

The repeat running durable turns and the output variation of each magnetic recording tape were measured. The results are respectively described in FIGS. 1 and 2 as "a".

REFERENCE 1

Figure 2:
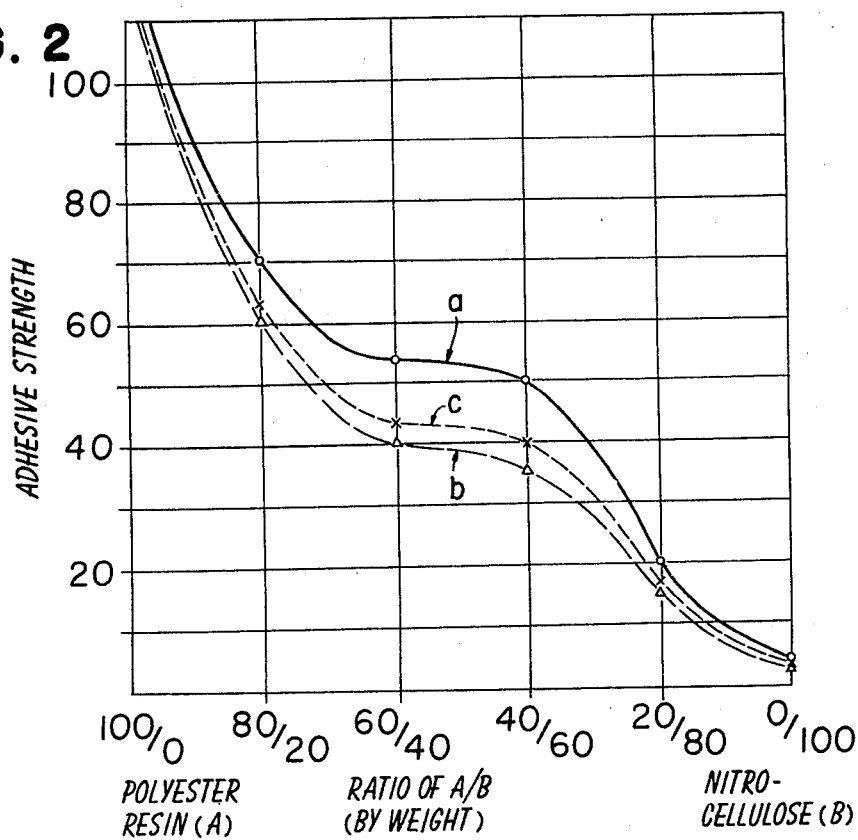
FIG. 2 is a graph for comparing adhesive strength of the same samples.

In accordance with the process of Example 1 except using nitrocellulose impregnated with isopropyl alcohol, magnetic recording tapes were prepared and the repeat running durable turns and the output variation of each magnetic recording tape were measured. The results are shown in FIGS. 1 and 2 as "b".

REFERENCE 2

In accordance with the process of Example 1 except using nitrocellulose impregnated with dibutyl phthalate, magnetic recording tapes were prepared. The samples are shown as "c". As it is clearly found by the results shown in FIGS. 1 and 2, the samples of the magnetic recording medium of the present invention has excellent repeat running durability and also excellent adhesive strength which could not be attained by using the conventional binders.

In the example, Co-adsorbed $\gamma$-Fe$_2$O$_3$ was used as the magnetic powder. It is possible to use $\gamma$-Fe$_2$O$_3$, Fe$_3$O$_4$ and Co-adsorbed Fe$_3$O$_4$ as the magnetic powder.

It is also possible to incorporate suitable additives such as fatty acids such as myristic acid, palmitic acid, stearic acid and behenic acid, silicone oil such as dimethyl siloxane, antistatic agents such as metal soaps and quaternary ammonium salts, dispersing agents such as fatty acid esters, phosphoric acid esters and higher alcohols.

We claim:

1. A magnetic recording medium, comprising: a magnetic layer comprising a magnetic powder and a binder coated on a substrate, said binder consisting essentially of 40–80 wt % of a polyester resin, 60–20 wt % of an isopropyl alcohol or dibutyl phthalate free-nitrocellulose containing vinyl chloride-vinyl acetate copolymer as a protective component for the nitrocellulose and a polyisocyanate.

2. The magnetic recording medium of claim 1, wherein said binder contains from 5–20 wt % of said polyisocyanate based on the total amount of binder.

3. The magnetic recording medium of claim 1, wherein said magnetic recording medium is a magnetic recording tape or sheet.

4. The magnetic recording medium of claim 1, wherein said magnetic powder is $\gamma$-$Fe_2O_3$ containing adsorbed cobalt, $\gamma$-$Fe_2O_3$, $Fe_3O_4$ and $Fe_3O_4$ containing adsorbed cobalt.

5. The magnetic recording medium of claim 1, wherein said magnetic layer further comprises a fatty acid, a silicone oil, an antistatic agent or a dispersing agent as optional additives.

6. The magnetic recording medium of claim 1, wherein said polyisocyanate is a polyurethane prepolymer formed by the reaction of a diisocyanate with a polyester or a polyether.

7. The magnetic recording medium of claim 6, wherein said polyurethane prepolymer has molecular weight with the range of $1 \times 10^3$ to $1 \times 10^5$.

8. The magnetic recording medium of claim 7, wherein said prepolymer has a molecular weight of $1 \times 10^4$ to $1 \times 10^5$.

9. The magnetic recording medium of claim 6, wherein said diisocyanate is diphenylmethane diisocyanate, dimethyldiphenylmethane diisocyanate, hexamethylene diisocyanate or tolylene diisocyanate.

10. The magnetic recording medium of claim 6, wherein said polyester is the reaction product of an aliphatic dicarboxylic acid and a polyhydric alcohol.

* * * * *